United States Patent

[11] 3,571,756

[72] Inventors Karl Ivan Lennart Skoog
Farsta;
Gunnar Lennart Kjellander, Bollmora;
Britt Ingegard Lunden, Jakobsberg,
Sweden

[21] Appl. No. 729,085
[22] Filed May 14, 1968
[45] Patented Mar. 23, 1971
[73] Assignee Telefonaktiebolaget L M Ericsson
Stockholm, Sweden
[32] Priority June 1, 1967
[33] Sweden
[31] 7667/67

[54] MODULATOR DEVICE
2 Claims, 1 Drawing Fig.

[52] U.S. Cl. .......... 332/9, 179/15
[51] Int. Cl. .......... H03k 13/02
[50] Field of Search .......... 307/255, 259, 240; 179/15 (A), 15 (LL); 325/38, 39, 141; 332/9, 9 (T), 10, 11

[56] References Cited
UNITED STATES PATENTS

| | | | |
|---|---|---|---|
| 3,270,335 | 8/1966 | Hackett | 325/38 |
| 2,931,919 | 4/1960 | Sacks | 307/259 |
| 2,997,606 | 8/1961 | Hamburger et al. | 307/255 |
| 3,386,053 | 5/1968 | Priddy | 307/255 |

*Primary Examiner*—Kathleen H. Claffy
*Assistant Examiner*—David L. Stewart
*Attorney*—Hane and Baxley

ABSTRACT: A pulse current modulator utilizes a pair of complementary transistors having interconnected collectors connected via a diode to an output load. The transistors are energized by an operating voltage connected across their emitters. The base of one of the transistors receives the amplitude modulated signal which is to be pulse control modulated while the base of the other transistor receives constant amplitude pulses to provide the pulse times of modulation.

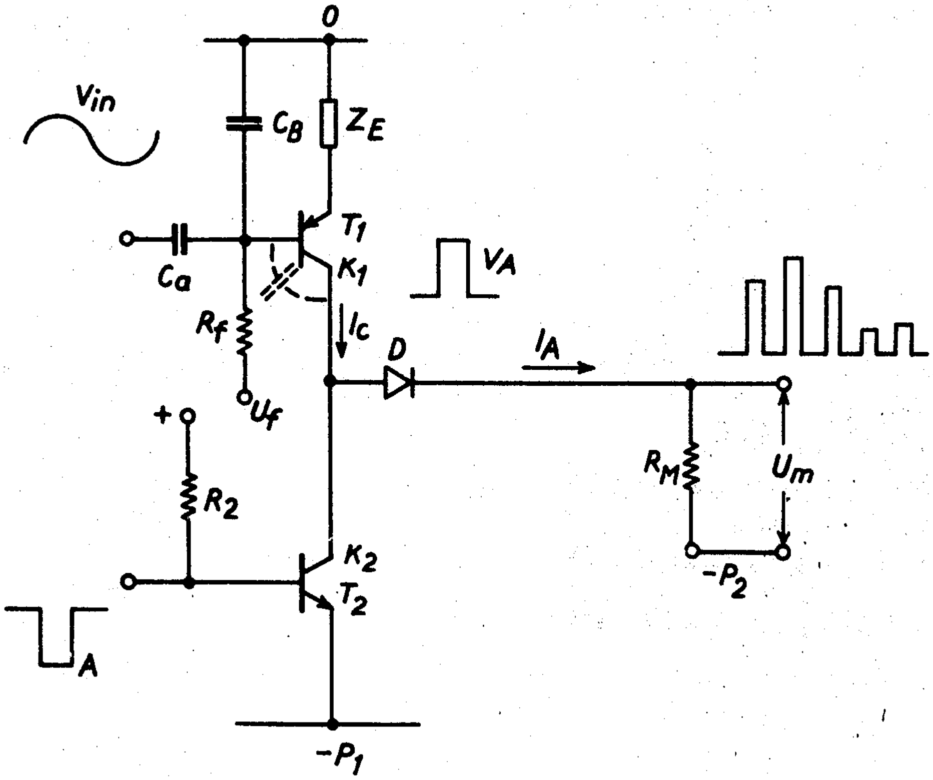
INVENTORS
KARL IVAN LENNART SKOOG
GUNNAR LENNART KJELLANDER
BRITT INGEGÄRD LUNDÉN
BY Hane and Baxley
ATTORNEYS

MODULATOR DEVICE

MODULATOR DEVICE

The present invention concerns an arrangement for pulse current modulation, especially for pulse current modulation, especially for a telephone system of the time division multiplex type (TDM-system) in which a current pulse proportional to the instantaneous value of an analogue signal, usually a speech signal, is to be generated at times fixed by a control signal.

In one type of modulators, the modulated signal is obtained in the form voltage pulses, the amplitudes of which correspond to the analogue signal. This however, implies some disadvantages since difficulties arise during voltage transmission due to the fact that the reference level on the transmitter side and the reference level on the receiver side cannot be kept identical but are affected by dynamic processes in other parts of the system.

The present invention makes use of the properties of a current modulator having a variable output impedance, which makes it possible for the modulator to adapt its impedance to the instantaneous value of the reference potential and to supply a current, the amplitude of which is proportional to the analogue signal. Such modulators are known, for example by the Swedish Pat. No. 199,431. Compared with said patent the modulator according to the invention presents certain advantages as will appear from the description.

An arrangement for pulse current modulation according to the invention is characterized thereby that the collectors of two transistors of different conductivity type are interconnected and in turn connected to a diode. Supplied to the base of one of the transistors is an analogue signal and supplied to the base of the other transistor is a pulsating control signal whereby the collector current of the first-mentioned transistor varies proportionally to said analogue signal while the other transistor is alternatively blocked or conducting in dependence on said control signal. Thus in the interval between the pulses of the control signal, the transistor is conducting, its collector current being equal to the collector current of the first-mentioned transistor, and the diode is biased, so that it is blocked. When however, the other transistor is blocked, the diode is conducting, so that a current pulse proportional to the instantaneous value of the analogue signal will pass through the diode at times fixed by the control signal.

Furthermore, if the first-mentioned transistor is provided with a high emitter impedance it practically works like a pure current amplifier.

In order to obtain a smooth and distortionless modulation, the base of the first-mentioned transistor can be connected through a resistance to a bias source and the analogue signal supplied to the base through a capacitor, so that the modulator becomes independent of the possible direct voltage variations of the input signal.

The invention will be described with reference to the accompanying drawing which shows a circuit diagram of an arrangement according to the invention.

The arrangement shown in the FIGURE comprises two transistors $T_1$ and $T_2$ of different conductivity type, their collectors $K_1$, $K_2$ being interconnected and connected to a diode D. The transistors $T_1$ and $T_2$ are shown as a PNP- and NPN-types respectively. The base of the transistor $T_1$ is connected to a bias source $U_f$, via a resistance $R_f$, and an analogue signal $v_{in}$ is supplied to the base via a capacitor $C_a$. The emitter of the transistor $T_1$ is connected to a stable reference potential O via an impedance $Z_E$. To the same reference potential O there is also connected the vase of the transistor $T_1$ via a capacitor $C_B$. The capacitance of capacitor $C_B$ is preferably much higher than the collector -base capacitance of the transistor (On the drawing the collector-base capacitance is indicated by dashed lines).

The base of the transistor $T_2$ is connected to a rather high, positive potential, via resistance $R_2$, so that the transistor $T_2$ is conducting, and, quiescently, a current $I_c$ passes from the collector to the emitter of transistor $T_2$ which is connected to a negative potential $-P_1$. The potential the collectors $K_1$ and $K_2$ will thus be very close to the potential $-P_1$. The diode D is connected to a negative potential $-P_2$ through a resistance $R_M$, and said negative potential is chosen so, that the diode D is back biased when the transistor $T_2$ is conducting i.e. the potential $-P_1$ is lower than the potential $-P_2$.

At recurrent times negative voltage pulses A of such amplitude to block transistor $T_2$ are supplied to the base of the transistor $T_2$. The collector voltage of the transistor $T_1$ will then shift to the reference potential O. Now the diode D will be conducting and a current $I_A$ can pass through the resistance $R_M$. If the voltage $-P_2$ is unstable, the amplitude of the voltage pulse $V_A$ will have different values for a given current $I_A$ depending on the variation of the voltage $- P_2$. However, by arranging the transistor $T_1$ in such a way that its output impedance changes according to the amplitude of the voltage pulses $V_A$, the current $I_c$ and thus the current $I_A$ will be kept relatively constant and relatively independent of the voltage $-P_2$, i.e. the current will solely be a function of the input voltage $V_in$. The voltage $U_m$ across the resistance $R_M$ will thus be proportional to the analogue signal $V_{in}$, said voltage being relatively independent of variations in the voltage $-P_2$.

In order to have the current $I_c$ relatively constant and relatively independent of the voltage of the collector $K_1$, the circuit including the transistor $T_1$ must be dimensioned carefully. The output impedance of the transistor $T_1$ will be very high due to the emitter impedance $Z_E$. When the collector of the transistor $T_1$ is exposed to the voltage pulses $V_A$, the inner feedback of the transistor, mainly caused by the collector-base capacitance, tends to decrease the current $I_c$. This, however, can be compensated by means of a capacitor $C_B$ connected to the base. The capacitance of said capacitor $C_B$ must be considerably higher than the collector-base capacitance indicated by dashed lines on the drawing, whereby the base potential will be only insignificantly affected. By an appropriate choice of the values of the impedance $Z_E$ and the capacitor $C_B$—obvious to a man skilled in the art —the output impedance of the transistor $T_1$ can be made to vary, so that the current $I_A$ and thus the voltage $U_m$ become relatively independent of the voltage $-P_2$ and linear functions of the analogue signal $V_{in}$.

We claim:

1. A pulse current modulator for generating current pulses having amplitudes proportional to the instantaneous amplitudes of an analogue signal comprising first and second transistors, said transistors being of complementary types, each of said transistors having base, emitter and collector terminals, said collector terminals being interconnected, means for applying an operating potential across the emitter terminals of said transistors, a second potential source, a diode means, means for connecting said diode means between the interconnected collector terminals and said second potential source, the potential of said second potential source being chosen with respect to the potential of said first potential source to render said diode means nonconducting when both of said transistors are conducting and to render said diode means conducting when said first transistor is conducting and said second transistor nonconducting, means for applying the analogue signal to the base terminal of said first transistor, and means for applying periodic signal pulses to the base terminal of said second transistor for switching said second transistor between conducting and nonconducting states whereby a current pulse having an amplitude related to the instantaneous amplitude of the analogue signal is transmitted via said diode means whenever said second transistor is nonconducting.

2. The modulator of claim 1 further comprising a capacitor connecting the base terminal of said first transistor to said source of operating potential for minimizing any signal feedback between the collector and base terminals of said first transistor.